3,031,453
BENZYL RESERPATES AND DESERPIDATES
Robert Armistead Lucas, Mendham, N.J., assignor to Ciba Pharmaceutical Products Inc., Summit, N.J., a corporation of New Jersey
No Drawing. Filed Sept. 1, 1959, Ser. No. 837,353
8 Claims. (Cl. 260—237)

The present invention concerns monoesters of deserpidic acids with acids. More particularly, it is directed to esters of the formula:

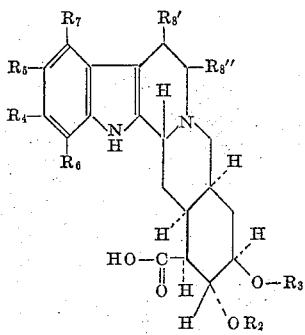

in which $R_2$ represents lower alkyl, $R_3$ stands for the acyl radical of an organic carboxylic acid, each of the radicals $R_4$, $R_5$, $R_6$ and $R_7$ stands for hydrogen, lower aliphatic hydrocarbon, etherified hydroxyl, etherified mercapto, nitro, amino or halogen, whereby two adjacent substituents may be taken together to form a cyclic substituent, and each of the radicals $R_8'$ and $R_8''$ represents hydrogen or lower alkyl, and salts of these compounds, as well as process for the preparation thereof.

The lower alkyl radical $R_2$ may stand for ethyl, propyl isopropyl and the like, but represents primarily methyl.

The radical $R_3$ is represented by the acyl group of a carboxylic acid. A variety of such acids may furnish such a radical, for example, lower aliphatic carboxylic acids, carbocyclic aryl carboxylic acids, carbocyclic aryl-lower aliphatic carboxylic acids, heterocylic aryl carboxylic acids or heterocyclic aryl-lower aliphatic carboxylic acids.

Lower aliphatic carboxylic acids may be lower alkanoic acids, lower cycloalkanoic acids, lower cycloalkyl-lower alkanoic acids, lower alkenoic acids, lower cycloalkenoic acids or lower cycloalkyl-lower alkenoic acids, which may contain additional substituents such as functional groups, and analogous acids. Examples of such acids are acetic, propionic, butyric, isobutyric, trimethylacetic, hexahydrozenzoic, cyclopentylpropionic, acrylic, methylacrylic, crotonic, isocrotonic, angelic, tiglic or tetrolic acid and the like, or substituted lower aliphatic acids, e.g. ethoxy-carbonic, pyruvic, methoxyacetic, phenoxyacetic, dimethyl-laminoacetic, acetoacetic, shikimic, prephenic and the like, or amino carboxylic acids e.g. glutamic acid and the like. Aliphatic carboxylic acids are also dicarboxylic acids, e.g. malonic, succinic, glutaric, malic, fumaric, maleic, tartaric, citric or tetrahydrophthalic acid and the like.

Primarily anticipated as acyl radicals of organic carboxylic acids are those of carbocyclic aryl carboxylic acids; benzoic acid and benzoic acids substituted by lower alkyl, hydroxyl, lower alkoxy, lower alkylenedioxy, lower alkanoyloxy, lower alkoxy-carbonyloxy, nitro, amino, halogen, lower alkyl-mercapto and the like form the preferred group of acids furnishing the acyl radical. Such acids are, for example, lower alkyl substituted benzoic acids, e.g. o-toluic, p-toluic acid or 3,4,5-trimethyl-benzoic acid and the like, hydroxyl substituted benzoic acids, e.g. 4-hydroxy-benzoic, 3,4-dihydroxy-benzoic or 2,5-dihydroxy-benzoic acid and the like, lower alkoxy substituted, such as methoxy or ethoxy substituted benzoic acids, e.g. 4-methoxy-benzoic, 3,4-dimethoxy-benzoic, 3,4,5 - trimethoxy-benzoic, 4 - ethoxy-benzoic, 3,4,5 - triethoxy-benzoic, vanillic or syringic acid and the like, lower alkylenedioxy substituted benzoic acids, e.g. piperonylic acid and the like, lower alkanoloxy-benzoic acids, e.g. 4-acetoxy-benzoic acid and the like, lower alkoxy-carbonyloxy-benzoic acids, such as O-lower alkoxy-carbonyl-vanillic or O-lower alkoxy-carbonyl-syringic acids, e.g. O-ethoxy-carbonyl-vanillic, O - methoxy-carbonyl-syringic or O-ethoxycarbonyl-syringic acid and the like, nitro-substituted benzoic acids, e.g. 3-nitro-benzoic or 4-nitro-benzoic acid and the like, amino substituted benzoic acids, e.g. 3-aminobenzoic or 4-amino-benzoic acid and the like, di-lower alkyl-amino-benzoic acid, e.g. 3-dimethyl-amino-benzoic or 4-dimethylamino-benzoic acid and the like, halogen substituted benzoic acids, e.g. 4-fluorobenzoic, 4-chloro-benzoic or 3,4-dichloro-benzoic acid and the like, lower alkyl-mercapto substituted benzoic acids, e.g. 4-methylmercapto-benzoic acid and the like, or other similar benzoic acids. Monocyclic carbocyclic aryl dicarboxylic acids are, for example, phthalic, isophthalic, terephthalic acid and the like.

Bicyclic carbocyclic aryl carboxylic acids are 1-naphthoic or 2-naphthoic acids or substituted naphthoic acids, such as, for example, 1-methoxy-2-naphthoic or 1-ethoxycarbonyloxy-2-naphthoic acid and the like.

Carbocyclic aryl-lower aliphatic carboxylic acids are primarily lower alkanoic or lower alkenoic acids substituted by monocyclic carbocyclic aryl radicals. Examples of such acids are phenyl-acetic, 4-methoxy-phenyl-acetic, 3,4,5-trimethoxy-phenyl-acetic, diphenylacetic, 2-methoxy-2-phenyl-acetic, 2 - ethoxycarbonyloxy-2-phenyl-acetic, 3-phenyl-propionic, 3-(3,4,5-trimethoxy-phenyl)-propionic, cinnamic, 4 - methoxy - cinnamic, 3,4,5 - trimethoxy-cinnamic, ferulic or O-ethoxycarbonyl-ferulic acid and the like.

Heterocyclic aryl carboxylic acids are particularly monocyclic heterocyclic aryl carboxylic acids, which contain nitrogen, sulfur or oxygen as ring members. Such acids are, for example, nicotinic, isonicotinic, 2-thienoic or 2-furoic acid and the like, which may contain additional substituents such as, for example, lower alkyl. Bicyclic heterocyclic aryl carboxylic acids, are, for example, quinolyl carboxylic acids, e.g. 6-quinolyl-carboxylic acid and the like.

Heterocyclic aryl-lower aliphatic carboxylic acids are primarily monocyclic heterocyclic aryl-lower alkanoic acids, e.g. 3-pyridyl-acetic, 4-pyridyl-acetic or 2-thienyl-acetic acid and the like.

The substituents $R_4$, $R_5$, $R_6$ and $R_7$ stand for hydrogen, lower aliphatic hydrocarbon, such as lower alkyl, e.g. methyl, ethyl and the like, etherified hydroxyl, such as lower aliphatic hydrocarbonoxy, for example, lower alkoxy e.g. methoxy, ethoxy, n-propyloxy, isopropyloxy, n-butyloxy and the like, carbocyclic aryloxy, such as monocyclic carbocyclic aryloxy, e.g. phenyloxy and the like, or carbocyclic aryl-lower aliphatic hydrocarbonoxy, such as monocyclic carbocyclic aryl-lower alkoxy, e.g. benzyloxy and the like, etherified mercapto, particularly aliphatic hydrocarbon-mercapto, such as lower alkyl-mercapto, e.g. methyl-mercapto or ethylmercapto and the like, nitro, amino, especially tertiary amino, such as N,N-di-lower alkyl-amino, e.g. dimethylamino or diethylamino and the like, or halogen, e.g. fluorine, chlorine or bromine and the like. Furthermore, two adjacent substituents may be bridged to form a cyclic substituent; for example, two adjacent hydroxyl groups may be joined through an etherifying lower alkylene, e.g. methylene, radical and form a lower alkylenedioxy, e.g. methylenedioxy, group.

Each of the radicals $R_8'$ and $R_8''$ stands preferably for hydrogen; if they represent lower alkyl, such radicals may be ethyl, or primarily methyl.

Salts of the new diesters of this invention are addition salts with acids, primarily inorganic acids, such as mineral acids, e.g. hydrochloric, hydrobromic, sulfuric or phosphoric acid, or strong organic acids, e.g. acetic, hydroxyacetic, methane sulfonic acid or similar acids. Furthermore, salts with metals, particularly alkali metals, such as sodium or potassium, may be formed as well.

The compounds of the present invention are useful intermediates in the preparation of antihypertensive and sedative diesters of deserpidic acid compounds. Such diesters are primarily compounds of the formula:

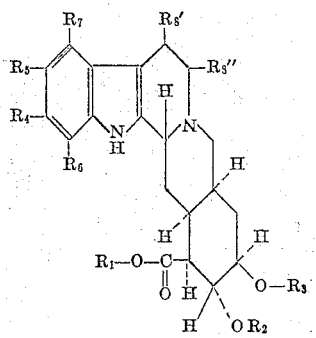

in which $R_2$, $R_3$, $R_4$, $R_5$, $R_6$, $R_7$, $R_8'$ and $R_8''$ have the previously-given meaning, and $R_1$ represents lower alkyl e.g. methyl, ethyl, n-propyl, n-butyl, isobutyl, n-pentyl and the like, or substituted lower alkyl, such as lower alkoxy-lower alkyl, in which lower alkyl separates lower alkoxy from the carbon atoms of the carboxyl group by from two to seven, particularly by from two to three, carbon atoms, for example, 2-methoxyethyl, 2-ethoxyethyl or 3-methoxypropyl and the like, or tertiary amino-lower alkyl, in which lower alkyl separates the tertiary amino portion from the carbon atom of the carboxyl group by from two to seven, particularly by from two to three carbon atoms, such as N,N-di-lower alkyl-amino-lower alkyl, in which lower alkyl separates N,N-di-lower alkyl-amino from the carbon atom of the carboxyl group by two to three carbon atoms, e.g. 2-dimethylaminoethyl, 2-diethylaminoethyl or 3-dimethylaminopropyl, or N,N-lower alkylene-imino-lower alkyl, in which lower alkyl separates N,N-lower alkylene-imino from the carboxyl group by two to three carbon atoms and lower alkylene contains from four to six carbon atoms, e.g. 2-(1-piperidino)-ethyl or 3-(1-pyrrolidino)-propyl and the like.

These diesters may be prepared by esterifying the compounds of this invention of the above-given formula with a diazo compound of the formula $R_1-N_2$, in which $R_1$ represents lower alkyl or substituted lower alkyl as outlined hereinbefore. The esterification reaction is carried out according to methods known in themselves. For example, a solution of the diazo compound in an inert solvent, for example, in diethylether, is used; the free acid may be added to the diazo reagent using a solution of the acid, for example, with a lower alkanol, e.g. methanol or ethanol and the like. An excess of the diazo compound present after completion of the addition may be destroyed, for example, by addition of a further carboxylic acid, e.g. acetic or benzoic acid.

Particularly useful as intermediates for the preparation of highly active antihypertensive and sedative diesters are 11-$R_4$-deserpidic acids, in which the hydroxyl group in 18-position is esterified with a benzoic acid substituted by lower alkoxy, e.g. methoxy and the like, lower alkylenedioxy, e.g. methylenedioxy, lower alkoxy-carbonyloxy, e.g. ethoxy-carbonyloxy and the like, or di-lower alkylamino, e.g. dimethylamino and the like, or with a cinnamoyl group, the carbocyclic ring of which is substituted by lower alkoxy, e.g. methoxy and the like, or lower alkoxy-carbonyloxy, e.g. ethoxy-carbonyloxy and the like, and $R_4$ represents hydrogen or methoxy. These compounds may be converted to a group of highly active compounds by treatment with lower diazo-alkanes, particularly diazomethane and the like, 2-lower alkoxy-diazoethane, such as 2-methoxy-diazoethane and the like, or 2-di-lower alkyl-amino-diazoethane, such as 2-dimethylamino-diazoethane and the like, according to the previously-given procedure.

The compounds of this invention may be prepared by hydrogenolysis of compounds of the formula:

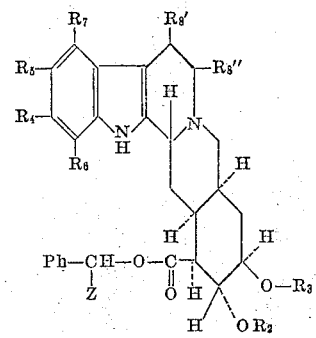

in which $R_2$, $R_3$, $R_4$, $R_5$, $R_6$, $R_7$, $R_8'$ and $R_8''$ have the previously-given meaning, Ph represents a monocyclic carbocyclic aryl radical, and Z stands for hydrogen or lower alkyl, in the presence of a catalyst, and, if desired, a resulting salt is converted into the free compound, and/or, a resulting compound is converted into a salt thereof.

The monocyclic carbocyclic aryl radical Ph of the starting material of the above-given formula stands primarily for phenyl; it may also be represented by substituted phenyl, whereby substituents may be lower alkyl, e.g. methyl, ethyl and the like, lower alkoxy, e.g. methoxy, ethoxy and the like, or halogen, e.g. fluorine, chlorine and the like, etc. or any other substituent, which does not hinder the hydrogenolytic cleavage of the monocyclic carbocyclic aryl-methyl radical. Although Z may represent lower alkyl, e.g. methyl, ethyl, n-propyl, isopropyl and the like, it stands primarily for hydrogen.

Hydrogenolysis is carried out by reacting the starting material, preferably kept in solution, for example, in a lower alkanol, e.g. methanol or ethanol and the like or a halogenated lower hydrocarbon, e.g. chloroform, methylene chloride and the like, with hydrogen in the presence of a catalyst, which contains a metal of the eighth group of periodic system, for example, palladium, e.g. palladium black, etc. If necessary, increased pressure, and/or elevated temperature may be employed, although normally the reaction proceeds under atmospheric pressure and at room temperature. In order to secure complete hydrogenolysis, the reaction vessel is agitated to expose the catalyst to the hydrogen atmosphere.

The resulting reaction mixture is freed from the catalyst, for example, by filtration, if necessary, after having dissolved any organic precipitate formed during hydrogenolysis by adding more diluent. The desired products are isolated according to standard methods, for example, by extraction, crystallization, adsorption and elution, etc. and are purified, for example, by recrystallization.

The esterified carboxyl group in the above formula may also be cleaved, for example, by treatment with a hydogen halide, e.g. hydrogen bromide, in a lower alkanoic acid, e.g. acetic acid.

A group of especially useful compounds of this invention may be obtained, for example, by hydrogenolytic cleavage of benzyl 11-$R_4$-18-O-$R_3$-deserpidates, in which $R_3$ stands for a benzoyl group substituted by lower alkoxy, e.g. methoxy and the like, lower alkylenedioxy, e.g. methylenedioxy, lower alkoxy-carbonyloxy, e.g. ethoxy-carbonyloxy and the like, or di-lower alkylamino, e.g. dimethylamino and the like, or for a cinnamoyl group, the carbocyclic ring of which is substituted by lower alkoxy, e.g. methoxy and the like, or lower alkoxy-carbonyloxy, e.g. ethoxy-carbonyloxy and the like, and $R_4$ represents hydrogen or methoxy, by treatment with hydrogen in the presence of a palladium catalyst.

The starting materials used in the process of this invention as well as the acid addition salts thereof are new and are intended to be included within the scope of the present invention. They are useful intermediates in a procedure for the preparation of pharmacologically active compounds.

A particularly outstanding group of intermediates are the benzyl 11-$R_4$-18-O-$R_3$-deserpidates, in which $R_3$ stands for a benzoyl group substituted by lower alkoxy e.g. methoxy and the like, lower alkylenedioxy, e.g. methylenedioxy, lower alkoxy-carbonyloxy, e.g. ethoxy-carbonyloxy and the like, or di-lower alkyl-amino, e.g. dimethylamino and the like, or for a cinnamoyl group, the carbocyclic ring of which is substituted by lower alkoxy, e.g. methoxy and the like, or lower alkoxy-carbonyloxy, e.g. ethoxy-carbonyloxy and the like, and $R_4$ represents hydrogen or methoxy.

These intermediates may advantageously be prepared by alcoholysis of compounds of the formula:

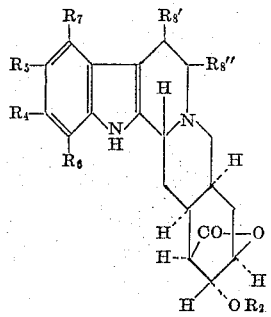

in which $R_2$, $R_4$, $R_5$, $R_6$, $R_7$, $R_8'$ and $R_8''$ have the previously-given meaning, with an alcohol of the formula Ph—(Z)CH—OH, in which Ph and Z have the previously-given meaning, in the presence of an alkali metal compound of such alcohol and esterifying in resulting compounds of the formula:

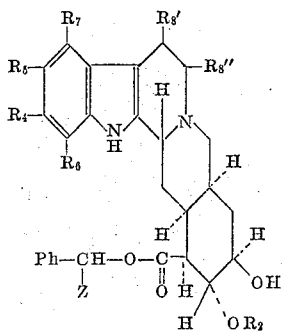

in which $R_2$, $R_4$, $R_5$, $R_6$, $R_7$, $R_8'$, $R_8''$, Ph and Z have the previously-indicated meaning, the free hydroxyl group with a functional derivative of a carboxylic acid of the formula $R_3$—OH, in which $R_3$ has the previously-given meaning, or a salt thereof.

The alcoholysis of deserpidic acid lactone compounds may be carried out, for example, by treating an alcohol of the formula Ph—(Z)CH—OH, in which Ph and Z have the previously-indicated meaning, or a solution thereof in an inert solvent, with an alkali metal, e.g. sodium or potassium, and reacting the resulting reagent with the deserpidic acid lactone compound or a solution thereof. The reaction may proceed under cooling or at room temperature, but may be more readily completed at an elevated temperature, and if necessary, in the atmosphere of an inert gas, e.g. nitrogen.

The free hydroxyl group in the resulting deserpidate monoester, in which the carboxyl group is esterified with an alcohol of the formula Ph—(Z)CH—OH, in which Ph and Z have the above-indicated meaning, is then esterified with a reactive functional derivative of a carboxylic acid of the formula $R_3$—CH, in which $R_3$ has the above-given meaning, particularly with a halide, e.g. chloride, or an anhydride of such an acid. If the functional derivative of the carboxylic acid contains a salt forming group as a substituent, for example, an amino group, such derivative may be used in the form of an acid addition salt, particularly with an inorganic acid, such as a mineral acid, e.g. hydrochloric acid. These esterifying derivatives are reacted with the compounds to be esterified under anhydrous conditions, and, if necessary, in the presence of a reagent capable of neutralizing generated acid. Such reagents are, for example, organic tertiary bases, particularly heterocyclic tertiary bases, e.g. pyridine, picoline, collidine or lutidine and the like, or aliphatic tertiary amines, e.g. N,N,N-trimethylamine, N,N - dimethyl - N - ethyl-amine, N,N-diethyl-N-methyl-amine or N,N,N-triethylamine and the like. Other suitable reagents are, for example, alkali metal or alkaline earth metal carbonates, e.g. sodium, potassium or calcium carbonate or hydrogen carbonate and the like. The liquid organic bases or the liquid esterifying reagents, for example, acetic acid anhydride or propionic acid anhydride and the like, may simultaneously serve as solvents; other suitable solvents are, for example, aromatic hydrocarbons, e.g. benzene, toluene or xylene and the like, or aliphatic hydrocarbons, e.g. pentane or hexane and the like. The reaction may be carried out under cooling, at room temperature, or, if necessary, at an elevated temperature, and, if desired, in the atmosphere of an inert gas, e.g. nitrogen and/or with the exclusion of moisture.

A preferred group of intermediates may be prepared by alcoholysis of 11-$R_4$-deserpidic acid lactone, in which $R_4$ represents hydrogen or lower alkoxy, with benzylalcohol in the presence of an alkali metal, particularly sodium, compound of benzyl alcohol, and reacting the resulting benzyl 11-$R_4$-deserpidate, in which $R_4$ has the previously-given meaning, with the chloride of a carboxylic acid of the formula $R_3$—OH, in which R represents a benzoyl radical substituted by lower alkoxy, e.g. methoxy and the like, lower alkylenedioxy, e.g. methylenedioxy, lower alkoxy-carbonyloxy, e.g. ethoxy-carbonyloxy and the like, or di-lower alkyl-amino, e.g. dimethylamino and the like, or a cinnamoyl radical substituted in the carbocyclic aryl portion by lower alkoxy, e.g. methoxy and the like, or lower alkoxy-carbonyloxy, e.g. ethoxy-carbonyloxy and the like, in the presence of a pyridine-type base, e.g. pyridine.

In the procedure for preparing the starting materials used for the manufacture of the compounds of this invention, new and useful intermediates are formed, which are intended to be included within the scope of the present invention. The monoesters of the formula:

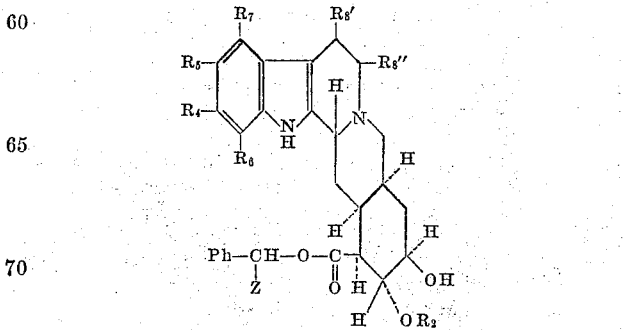

in which $R_2$, $R_4$, $R_5$, $R_6$, $R_7$, $R_8'$, $R_8''$, Ph and Z have the previously-given meaning, which are obtained by alcoholysis of the lactones having the previously-given formula, with an alcohol of the formula Ph—(Z)CH—OH, in which Ph and Z have the previously-given meaning, in the presence of an alkali metal compound of such an alcohol, can be, as has been shown hereinbefore, converted into the starting material for the preparation of the compounds of this invention by treatment with a reactive functional derivative of a carboxylic acid of the formula $R_3$—OH, in which $R_3$ has the above-indicated meaning, particularly a halide, e.g. chloride, or an anhydride as previously described in detail.

Especially useful as such intermediates are benzyl 11-$R_4$-deserpidates, in which $R_4$ represents hydrogen or methoxy, or salts thereof, which are prepared by alcoholysis of 11-$R_4$-deserpidic acid lactones with benzylalcohol in the presence of an alkali metal, e.g. sodium, compound of benzylalcohol, for example, in the absence of an additional solvent. They can be converted into the selected group of benzyl 11-$R_4$-18-O-$R_3$-deserpidates, in which $R_3$ stands for a benzoyl radical substituted by lower alkoxy, e.g. methoxy and the like, lower alkylenedioxy, e.g. methylenedioxy, lower alkoxy-carbonyloxy, e.g. ethoxy-carbonyloxy and the like, or di-lower alkylamino, e.g. dimethylamino and the like, or a cinnamoyl radical substituted in the carbocyclic aryl portion by lower alkoxy, e.g. methoxy and the like, or lower alkoxy-carbonyloxy, e.g. ethoxy-carbonyloxy and the like, and $R_4$ represents hydrogen or methoxy, by treatment with a chloride of a carboxylic acid of the formula $R_3$—OH, in which $R_3$ has the afore-mentioned preferred meaning; details of such procedure have been given hereinabove.

The lactones, used as the starting material, are known or, if new, may be prepared according to the methods used for the known compounds.

The compounds of the present invention may also be prepared by reducing in compounds of the formula:

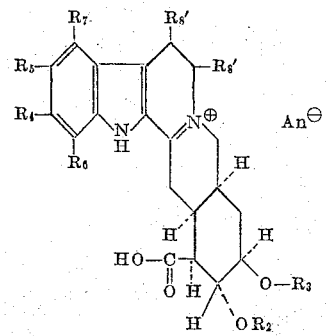

in which $R_2$, $R_3$, $R_4$, $R_5$, $R_6$, $R_7$, $R_8'$ and $R_8''$ have the above-given meaning and An$^\ominus$ represents the anion of an acid, the 3(4)-double bond and, if desired, carrying out the optional steps.

In the above starting materials, which are new and are intended to be included within the scope of the present invention, An represents the anion of a strong inorganic acid, such as a mineral acid, for example, a hydrohalic acid, e.g. hydrochloric acid, or phosphoric acid, a halogeno phosphoric acid, e.g. a chlorophosphoric acid, or perchloric acid and the like, or of a strong organic acid, such as a lower aliphatic acid, e.g. acetic acid and the like. A preferred group of starting materials are 18-O-$R_3$-3,4-didehydro-reserpic acid salts and 18-O-$R_3$-3,4-didehydro-deserpidic acid salts with strong inorganic or strong organic acids, in which $R_3$ represents the acyl radical of a benzoic acid substituted by lower alkoxy, e.g. methoxy and the like, lower alkylenedioxy, e.g. methylenedioxy, lower alkoxy-carbonyloxy, e.g. ethoxy-carbonyloxy and the like, or di-lower alkyl-amino, e.g. dimethylamino and the like, or of a cinnamoyl acid, the carbocyclic nucleus of which is substituted by lower alkoxy, e.g. methoxy and the like. or by lower alkoxycarbonyloxy, e.g. ethoxy-carbonyloxy and the like. This group of starting materials may be illustrated by 3,4-didehydro-18-O-(3,4,5-trimethoxy-benzoyl)reserpic acid chloride, perchloride or acetate and 3,4-didehydro-18-O-(3,4,5-trimethoxy-benzoyl)-deserpidic acid chloride, perchlorate and acetate.

The reduction may be carried out with nascent hydrogen in the presence of an acidic medium. For example, a solution of the starting material in an acid, for example, acetic acid (as glacial acetic acid) or perchloric acid (for example, an aqueous solution of such an acid) may be treated with an appropriate metal, for example, zinc. The desired product may then be obtained according to known methods, for example, by evaporating the solvent, if desired, after neutralizing, and isolating the deserpidic acid derivative of this invention.

The starting material having the previously-given formula may be prepared, for example, by alcoholysis of a compound of the formula:

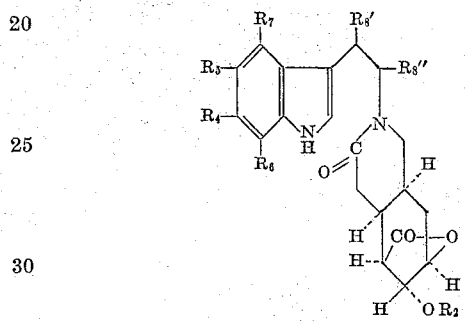

in which $R_2$, $R_4$, $R_5$, $R_6$, $R_7$, $R_8'$ and $R_8''$, with an alcohol of the formula Ph—(Z)CH—OH, in which Ph and Z have the previously-given meaning, in the presence of an alkali metal, e.g. sodium or potassium, compound of such alcohol to form a 2,3-secodeserpidate compound of the formula:

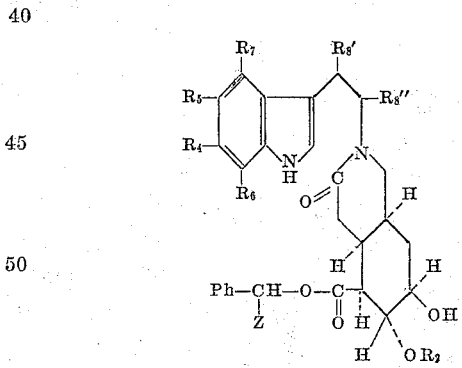

in which $R_2$, $R_4$, $R_5$, $R_6$, $R_7$, $R_8'$, $R_8''$, Ph and Z have the above-given meaning, which is converted into a compound of the formula:

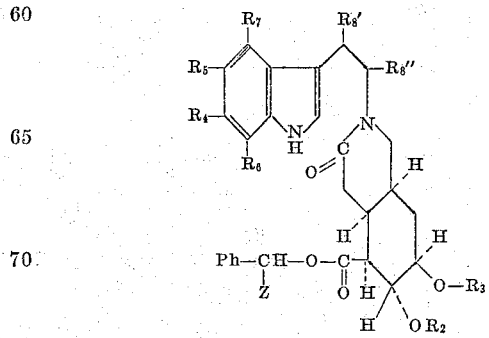

in which $R_2$, $R_3$, $R_4$, $R_5$, $R_6$, $R_7$, $R_8'$, $R_8''$, Ph and Z have the previously-given meaning, by treatment with a functional derivative of an acid of the formula $R_3$—OH, in which $R_3$ has the previously-given meaning, and ring closed to compounds of the formula:

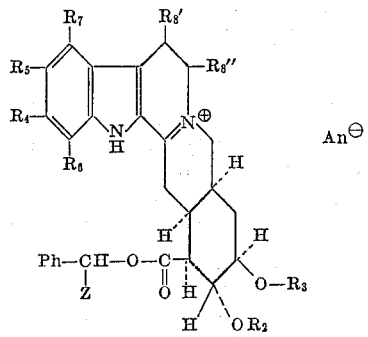

in which $R_2$, $R_3$, $R_4$, $R_5$, $R_6$, $R_7$, $R_8'$, $R_8''$, Ph, Z and $An^{\ominus}$ have the previously-given meaning, with a dehydrating ring-closing reagent, in which compounds the esterified carboxyl group is then cleaved to the free carboxyl group forming the desired starting material. In the above sequence of steps certain intermediates do not necessarily have to be isolated.

The lactone compounds, used in the first step of the synthesis for the preparation of the starting materials, are known, or, if new, may be prepared according to the procedure used for the known members.

The alcoholysis of the lactones and the acylation procedure may be carried out as previously shown. Ring closure is effected by means of dehydrating ring closing reagents, such as, for example, phosphoric acids, e.g. polyphosphoric acid, phosporous halides, e.g. phosphorous trichloride or phosphorous pentachloride, or advantageously phosphorous oxyhalides, e.g. phosphorous oxychloride.

Cleavage of the esterified carboxyl group may be achieved by hydrogenolysis, for example, by treatment with hydrogen in the presence of a catalyst, such as, for example, palladium on charcoal, and of a neutral solvent, such as, for example, a lower alkanol e.g. methanol or ethanol and the like. In such reduction procedure care has to be taken that the 3(4)-double bond is not reduced simultaneously; preferably, only the required amount of hydrogen is allowed to be absorbed, which is necessary for the cleavage of the esterified carboxyl group. The esterified carboxyl group may also be converted into a free carboxyl group by treatment with hydrogen bromide, advantageously used in a glacial acetic acid solution.

Certain intermediates in the above preparation of the starting materials are new and are intended to be included within the scope of this application. For example, 2,3-seco-deserpidate compounds of the formula:

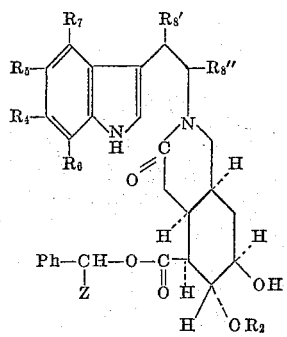

in which $R_2$, $R_4$, $R_5$, $R_6$, $R_7$, $R_8'$, $R_8''$, Ph and Z have the previously-given meaning, are important intermediates in the preparation of the starting material. Specific examples of such intermediates are benzyl 3-oxo-2,3-seco-reserpate, benzyl 3-oxo-2,3-seco-deserpidate and analogous benzyl deserpidates, which contain previously described substituents in positions 5, 6, 9, 10, 11, 12 and 17.

An additional series of valuable intermediates are, for example, compounds of the formula:

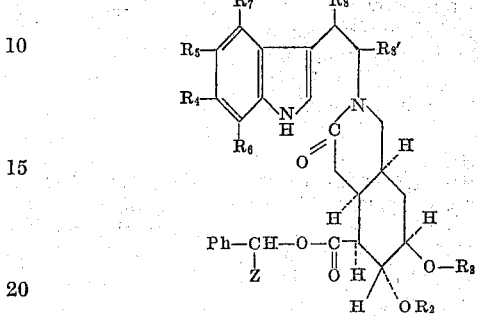

in which $R_2$, $R_3$, $R_4$, $R_5$, $R_6$, $R_7$, $R_8'$, $R_8''$, Ph and Z have the previously-given meaning; benzyl 18-O-$R_3$-3-oxo-2,3-seco-reserpates and benzyl 18-O-$R_3$-3-oxo-2,3-seco-deserpidates, in which $R_3$ represents the acyl radical of the previously-mentioned preferred group of benzoic and cinnamic acids are a preferred group of intermediates, which may be illustrated by benzyl 3-oxo-2,3-seco-18-O-(3,4,5-trimethoxy-benzoyl)-reserpate and benzyl 3-oxo-2,3-seco-18-O-(3,4,5-trimethoxy-benzoyl)-deserpidate as specific examples.

Compounds of the formula:

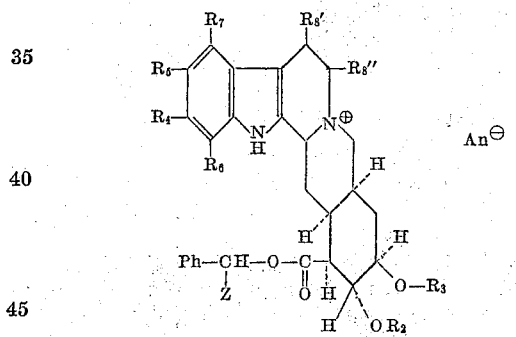

in which $R_2$, $R_3$, $R_4$, $R_5$, $R_6$, $R_7$, $R_8'$, $R_8''$, Ph, Z and $An^{\ominus}$ have the previously-given meaning, are a third group of new and valuable intermediates. They are represented, for example, by benzyl 18-O-$R_3$-3,4-didehydro-reserpate salts and benzyl 18-O-$R_3$-3,4-didehydro-deserpidate salts with strong inorganic or strong organic acids, in which $R_3$ represents the acyl radical of the above-mentioned, preferred benzoic or cinnamic acids; specific examples are benzyl 3,4-didehydro-18-O-(3,4,5-trimethoxy-benzoyl)-reserpate chloride, perchlorate or acetate, as well as benzyl 3,4-didehydro-18-O-(3,4,5-trimethoxy-benzoyl)-deserpidate chloride, perchlorate or acetate.

An additional procedure for the preparation of the compounds of this invention comprises reducing in $\Delta^{3(14)}$-deserpidic acid compounds of the formula:

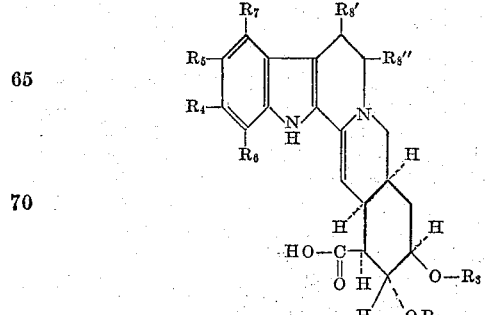

in which $R_2$, $R_3$, $R_4$, $R_5$, $R_6$, $R_7$, $R_8'$ and $R_8''$ have the previously-given meaning, the 3(14)-double bond, and, if desired, carrying out the optional steps.

The reduction of the above procedure may be carried out as previously shown, i.e. by treatment of an acid, e.g. acetic or perchloric acid, solution of the $\Delta^{3(14)}$-deserpidic acid compound with a metal, such as, for example, zinc. It should be noted that in the acidic medium the 3(14)-double bond may migrate into the 3(4)-position and the actually reduced compound may be the 3,4-didehydro-deserpidic acid salt compound.

The starting materials, which are used in the above modification of the process of the invention, are new and are intended to be included within the scope of this invention. A preferred group of starting materials are the $\Delta^{3(14)}$-18-O-$R_3$-reserpic acids and $\Delta^{3(14)}$-18-O-$R_3$-deserpidic acids, in which $R_3$ represents the acyl radical of one of the previously-mentioned preferred benzoic and cinnamic acids; $\Delta^{3(14)}$-18-O-(3,4,5-trimethoxy-benzoyl) - reserpic acid and $\Delta^{3(14)}$-18-O-(3,4,5 - trimethoxy - benzoyl)-deserpidic acid are specific examples of this group of starting materials.

They may be prepared, for example, by treating compounds of the formula:

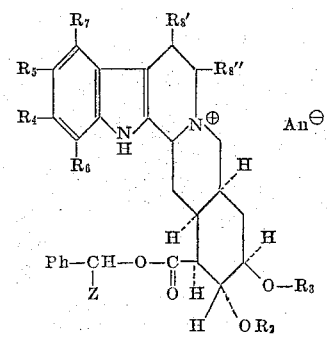

in which $R_2$, $R_3$, $R_4$, $R_5$, $R_6$, $R_7$, $R_8'$, $R_8''$, Ph, Z and $An^{\ominus}$ have the previously-given meaning, with a base and converting in a resulting compound of the formula:

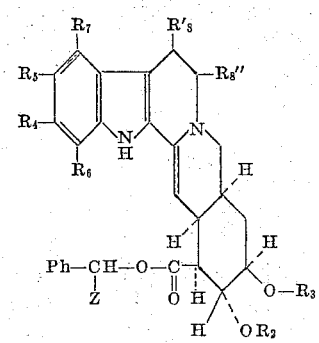

in which $R_2$, $R_3$, $R_4$, $R_5$, $R_6$, $R_7$, $R_8'$, $R_8''$, Ph and Z have the previously-given meaning, the esterified carboxyl group into a free carboxyl group.

The conversion of the 3,4-didehydro compounds into the $\Delta^{3(14)}$-deserpidate derivatives may be carried out by treatment with a base, particularly, with ammonia, e.g. concentrated aqueous ammonia. The esterified carboxyl group may be cleaved as shown hereinbefore, for example, by hydrogenolysis, whereby care has to be taken that the 3(14)-double bond is not reduced simultaneously.

The intermediates of the formula:

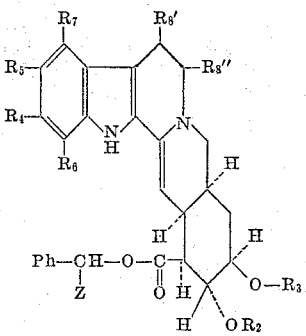

in which $R_2$, $R_3$, $R_4$, $R_5$, $R_6$, $R_7$, $R_8'$, $R_8''$, Ph and Z have the previously-given meaning, are new and are intended to be included within the scope of the present invention; a preferred group of such intermediates is represented by benzyl $\Delta^{3(14)}$-18-O-$R_3$-reserpates and benzyl $$\Delta^{3(14)}\text{-18-O-}R_3\text{-}$$

deserpidates, in which $R_3$ represents the acyl radical of on of the benzoic and cinnamic acids mentioned hereinbefore as a preferred group. Benzyl $\Delta^{3(14)}$-18-O-(3,4,5-trimethoxy-benzoyl)-reserpate and benzyl $\Delta^{3(14)}$-18-O-(3,4,5-trimethoxy-benzoyl)-deserpidate are examples of this group of valuable intermediates.

The starting materials may also be prepared by treating the previously shown 3,4-didehydro-deserpidic acid derivatives of the formula:

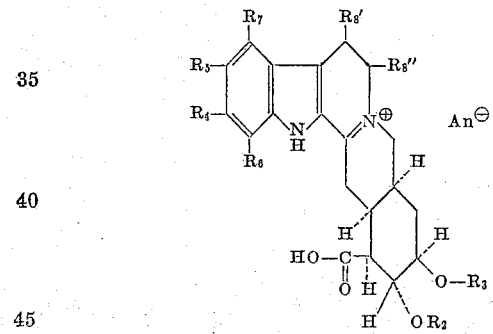

in which $R_2$, $R_3$, $R_4$, $R_5$, $R_6$, $R_7$, $R_8'$ and $R_8''$ have the previously-given meaning, with a base; such treatment may be carried out as has been previously shown.

The compounds of this invention may also be prepared by isomerizing in compounds of the formula:

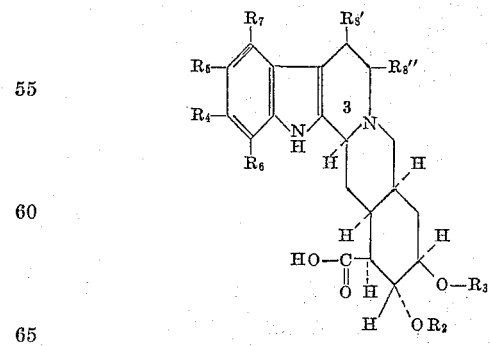

in which $R_2$, $R_3$, $R_4$, $R_5$, $R_6$, $R_7$, $R_8'$ and $R_8''$, have the previously-given meaning, or a salt thereof, the hydrogen attached to the 3-position in an acidic medium and isolating the desired product, and, if desired, carrying out the optional steps.

The isomerization procedure may be carried out by treatment of the starting material (belonging to the so-called "3-iso"-series) with acids, more especially, with lower aliphatic carboxylic acids, such as acetic or propionic acid and the like, especially glacial acetic acid, monocyclic carbocyclic aryl sulfonic acids, such as p-toluene sulfonic acid, or strong mineral acids, such as hydrohalic acids, e.g. hydrogen chloride, or mixtures of such acids. Thus, monocyclic carbocyclic aryl sulfonic acids are advantageously used together with a lower aliphatic carboxylic acid mentioned above, for example, p-toluene sulfonic acid in glacial acetic acid. The reaction may be carried out in the absence or presence of a solvent, at room temperature or preferably at an elevated temperature, in an open vessel or under pressure, preferably in an atmosphere of nitrogen.

Optimum yields in such an isomerization reaction may be obtained by removing the desired product from the reaction milieu, thus displacing the reaction equilibrium in favor of the product. The removal may be accomplished by separating the product or a salt thereof from the starting material on the basis of their relative solubilities in a solvent system, for example by adsorption on a suitable material, such as alumina or paper and subsequent fractional elution or by fractional crystallization from a solvent. The starting material separated from the desired end product may be recycled into the isomerization process, enhancing the over-all yield of the reaction.

The starting materials used in the above reaction are new and are intended to be included within the scope of the invention. A more specific group of such compounds are the 18-O-$R_3$-iso-reserpic acids and 18-O-$R_3$-3-iso-deserpidic acids, in which $R_3$ represents the acyl radicals of the previously-mentioned, preferred benzoic and cinnamic acids; examples of such compounds are the 18-O-(3,4,5-trimethoxy-benzoyl)-3-iso-reserpic acid and 18-O-(3,4,5-trimethoxy-benzoyl)-3-iso-deserpidic acid.

These starting materials may be prepared, for example, by reducing in compounds of the formulae:

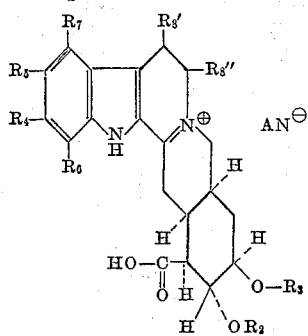

and

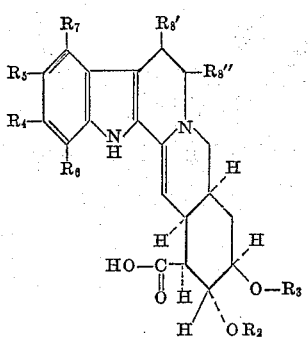

in which $R_2$, $R_3$, $R_4$, $R_5$, $R_6$, $R_7$, $R_8'$, $R_8''$ and $An^\ominus$ have the previously-given meaning, the double bond extending from the 3-position.

The above-mentioned reduction may be carried out, for example, by catalytic hydrogenation, such as treatment with hydrogen in the presence of a catalyst containing a metal of the eighth group of the periodic system, e.g. palladium (such as palladium on charcoal), and of a solvent, particularly a neutral solvent, such as a lower alkanol, e.g. methanol, ethanol and the like. The reduction may also be carried out by treatment of a solution of the starting material, for example, in a lower alkanol, e.g. methanol, ethanol and the like, with a metal hydride, such as an alkali metal borohydride, e.g. sodium borohydride and the like.

The compounds of the invention, as well as intermediates and starting materials used for their preparation may be employed or obtained as mixtures of racemates, as single racemates or as antipodes; mixtures of racemates may be separated into single racemates, which may be resolved into antipodes according to known methods. For example, the free base of a racemic d,l-compound may be dissolved in a solvent such as a lower alkanol, e.g. methanol or ethanol and the like, or a halogenated lower hydrocarbon, e.g. chloroform, or in a mixture of such solvents and one of the optically active forms of an acid containing an asymmetric carbon atom, or a solution thereof, for example, in the same solvents, is then added, whereupon a salt may be isolated, which is formed by the optically active acid with one of the optically active forms of the base. Especially useful as optically active forms of salt forming acids having an asymmetric carbon atom are D- and L-tartaric acid, as well as the optically active forms of di-p-toluyl-tartaric, malic, mandelic, camphor-10-sulfonic or quinic acid.

From a resulting salt, the free and optically active base may be obtained according to processes known for the conversion of a salt into a base, for example, as outlined hereinbelow. An optically active base may be converted into a therapeutically useful acid addition salt with one of the acids as will be mentioned hereinbelow. The optically active forms may also be obtained by resolution of the racemates by biochemical methods.

The compounds of this invention and the intermediates for their preparation may be obtained in the form of the free bases or as the acid addition salts thereof. A salt may be converted into the free base by treatment with an alkaline reagent, for example, with aqueous silver oxide or aqueous ammonia. A free base may be converted into its therapeutically useful acid addition salts by reaction with one of the inorganic or organic acids outlined hereinbefore; salt formation may be accomplished, for example, by treating a solution of the base in a solvent, such as a lower alkanol, e.g. methanol, ethanol, propanol or isopropanol and the like, with the acid or a solution thereof and isolating the desired salt. Compounds containing a free carboxyl group may also be obtained in the form of alkali metal, e.g. sodium or potassium, salts. Such salts may be converted into the free compounds by treatment with an acid, such as, for example, a mineral acid, e.g. hydrochloric acid, whereby care has to be taken that no isomerization occurs. An alkali metal salt may be prepared, for example, by reacting the free carboxylic acid with the stoichiometric amount of an alkali metal, e.g. sodium or potassium, hydroxide and removing the solvent.

The invention also comprises any modification of the process wherein a compound obtainable as an intermediate at any stage of the process is used as starting material and the remaining step(s) of the process is(are) carried out, as well as any new intermediates.

In the process of this invention such starting materials are preferably used which lead to final products mentioned in the beginning as preferred embodiments of the invention.

The present application is a continuation-in-part of my application Serial No. 787,339, filed January 19, 1959, now abandoned.

The following examples are intended to illustrate the invention and are not to be construed as being limitations thereon. Temperatures are given in degrees centigrade.

*Example 1*

1 g. of benzyl 18-O-(3,4,5-trimethoxy-benzoyl)-reserpate in 400 ml. of methanol is hydrogenated by treatment with hydrogen under atmospheric pressure in the presence of 0.4 g. of palladium black. After 15 minutes a white solid material is formed, stirring is continued for a total of four hours, and the precipitate is dissolved upon addition of methylene chloride. The catalyst is filtered off, the solution is evaporated under reduced pressure, and the foamy residue is crystallized from a methanol-methylene chloride mixture to yield 0.81 g. of the pink-colored 18-O-(3,4,5-trimethoxy-benzoyl)-reserpic acid, which crystallizes with one mole of methanol, M.P. 211–213°. Infrared studies reveal that the compound is present in the 3-epi-allo-configuration, identical with the one present in the alkaloid reserpine.

The starting material used in the above reaction may be prepared as follows: To 65 ml. of dry benzyl alcohol is added a small cube (about 0.025 g. to about 0.05 g.) of sodium. After completion of the reaction a total of 7.8 g. of reserpic acid lactone is added and the mixture is heated to 85–90° for 15 minutes during which time the lactone gradually dissolves. The solution is allowed to cool to room temperature in the course of one hour, and is then made acidic with a slight excess of aqueous hydrochloric acid (1:1). The resulting solution is poured into 700 ml. of ether, the supernatant ether is decanted, and the remaining gum is dissolved in a small volume of methanol. This solution is again poured into 700 ml. of ether, the ether is decanted and the gummy residue is slurried in 150 ml. of water. Ethyl acetate is added, the mixture is made basic with aqueous ammonia, the organic layer is separated and the aqueous phase is washed with additional ethyl acetate. The combined organic extracts are washed with water, filtered rapidly through a short column containing a synthetic magnesium silicate preparation, and the eluate is evaporated under reduced pressure. Fresh ethyl acetate is added to the residue, and on warming crystallization of the benzyl reserpate occurs, which is completed on addition of ether and cooling. The white crystalline product is filtered off and melts at 202–204°; yield: 4.0 g.

A mixture of 4.5 g. of benzyl reserpate, 2.4 g. of 3,4,5-trimethoxy-benzoyl chloride and 45 ml. of dry pyridine is allowed to stand at room temperature for 17 hours and is then poured into ice water. The resulting mixture is partly neutralized with dilute aqueous hydrochloric acid, made basic with aqueous ammonia in order to coagulate the finely distributed solid, which can then be filtered off, and is washed with water and dissolved in methylene chloride. The organic solution is filtered through a short column containing a synthetic magnesium silicate preparation, the eluate is evaporated to dryness under reduced pressure, and the resulting foam crystallizes from a mixture of ethyl acetate and petroleum ether to yield the benzyl 18-O-(3,4,5-trimethoxy-benzoyl)-reserpate, M.P. 189–191°; yield: 4.2 g.

Instead of using reserpic acid lactone as the starting material deserpidic acid lactone may be converted to the benzyl deserpidate according to the above procedure. Other deserpidic acid lactones, such as, for example, 5-methyl-reserpic acid lactone, 6-methyl-reserpic acid lactone, 6-methyl-deserpidic acid lactone, 9-methyl-deserpidic acid lactone, 11-methyl-deserpidic acid lactone, 9-methoxy-deserpidic acid lactone, 10-methoxy-deserpidic acid lactone, 10-methoxy-reserpic acid lactone, 11-ethoxy-deserpidic acid lactone, 11-n-propyloxy-deserpidic acid lactone, 12-methoxy-deserpidic acid lactone, 10,11-methylenedioxy-deserpidic acid lactone, 10-benzyloxy-deserpidic acid lactone, 11-benzyloxy-deserpidic acid lactone, 11-methylmercapto-deserpidic acid lactone, 11-ethylmercapto-deserpidic acid lactone, 10-chloro-deserpidic acid lactone, 17-desmethoxy-17-ethoxy-reserpidic acid lactone or 17-desmethoxy-17-n-propyloxy-reserpic and the like may be treated with benzylalcohol in the presence of an alkali metal, e.g. sodium and the like, compound of benzylalcohol to form the desired benzyl deserpidate compounds, such as, for example, benzyl 5-methyl-reserpate, benzyl 6-methyl reserpate, benzyl 6-methyl deserpidate, benzyl 9-methyl-deserpidate, benzyl 11-methyl-deserpidate, benzyl 9-methoxy-deserpidate, benzyl 10-methoxy-deserpidate, benzyl 10-methoxy-reserpate, benzyl 11-ethoxy-deserpidate, benzyl 11-n-propyloxy-deserpidate, benzyl 12-methoxy-deserpidate, benzyl 10,11-methylenedioxy-deserpidate, benzyl 10-benzyloxy-deserpidate, benzyl 11-benzyloxy-deserpidate, benzyl 11-methylmercapto-deserpidate, benzyl 11-ethylmercapto-deserpidate, benzyl 10-chloro-deserpidate, benzyl 17-desmethoxy-18-ethoxy-reserpate or benzyl 17-desmethoxy-17-isopropyloxy-reserpate and the like.

Instead of using 3,4,5-trimethoxy-benzoyl chloride as the esterifying reagent, other organic carboxylic acid halides, particularly chlorides, may be utilized to esterify the benzyl reserpate, benzyl deserpidate or the other benzyl deserpidates, for example, lower aliphatic carboxylic acid chlorides, e.g. butyryl chloride, pivalyl chloride, hexahydrobenzoyl chloride, crotonyl chloride or angelic acid chloride and the like, carbocyclic aryl carboxylic acid halides, such as monocyclic carbocylic aryl carboxylic acid chlorides, e.g. benzoyl chloride, 3,4,5-trimethylbenozyl chloride, 4-methoxy-benzoyl chloride, 3,4-dimethoxybenzoyl chloride, 3,4,5-triethoxy-benzoyl chloride, piperonyl chloride, 4-methoxy-carbonyl-syringoyl chloride, 3-nitrobenzoyl chloride, 4-nitrobenzoyl chloride (the nitro substituted acyl groups may subsequently be hydrogenated to amino groups during the hydrogenolysis step), 4-dimethylamino-benzoyl chloride or 3,4-dichloro-benzoyl chloride, and the like, or bicyclic carbocyclic aryl carboxylic acid chlorides, e.g. 1-naphthoyl chloride or 1-ethoxy-carbonyloxy-2-naphthoyl chloride and the like, carbocyclic aryl-lower aliphatic carboxylic acid halides, such as monocyclic carbocyclic aryl-lower alkanoic acid chlorides, e.g. phenylacetyl chloride, diphenylacetyl chloride, 3,4,5-trimethoxy-phenyl-acetyl chloride, 2-ethoxycarbonyloxy-2-phenyl-acetyl chloride, 3-(3,4,5-trimethoxy-phenyl)-propionyl chloride, cinnamoyl chloride, 3,4,5-trimethoxy-cinnamoyl chloride or 4-ethoxycarbonyl-ferulyl chloride and the like, heterocyclic aryl carboxylic acid halides, such as monocyclic heterocyclic aryl carbocyclic acid chlorides, e.g. nicotinoyl chloride, isonicotinoyl chloride, thienoyl chloride or furoyl chloride and the like, or heterocyclic aryl-lower aliphatic carboxylic acid halides, such as monocyclic heterocyclic aryl lower alkanoic acid chlorides, e.g. 3-pyridyl-acetyl chloride, 4-pyridyl-acetyl chloride or 2-thienyl-acetyl chloride and the like. The esterifying reaction is generally carried out according to the above-described procedure as illustrated in the above example, and esters, such as, benzyl 18-O-butyryl-reserpate, benzyl 18-O-hexahydrobenzoyl reserpate, benzyl 18-O-benzoyl-reserpate, benzyl 18-O-(3,4,5-trimethyl-benozyl)-reserpate, benzyl 18-O-piperonyl-reserpate, benzyl 18-O-(4-methoxycarbonyl-syringoyl)-reserpate, benzyl 18-O-(4-nitro-benzoyl)-reserpate, benzyl 18-O-(3,4-dichloro-benzoyl)-reserpate, benzyl 18-O-phenylacetyl-reserpate, benzyl 18-O-(3,4,5-trimethoxy-cinnamoyl)-reserpate, benzyl 18-O-nicotinoyl-reserpate, benzyl 18-O-pivalyl-deserpidate, benzyl 18-O-(4-methoxy-benzoyl)-deserpidate, benzyl 18-O-(3,4,5-trimethoxy-benzoyl)-deserpidate, benzyl 18-O-(4-ethoxycarbonyl-syringoyl)-deserpidate, benzyl 18-O-(3-dimethylamino-benzoyl)-deserpidate, benzyl 18-O-(3,4,5-trimethoxy-phenylacetyl)-deserpidate, benzyl 18-O-(3,4,5-trimethoxy-cinnamoyl)-deserpidate, benzyl 6-methyl-18-O-(3,4,5-trimethoxy-benzoyl)-reserpate, benzyl 10-methoxy-18-O-(3,4,5-trimethoxy-benzoyl)-deserpidate, benzyl 11-ethoxy-18-O-(3-dimethylamino-benzoyl)-deserpidate, benzyl 12-methoxy-18-O-(3,4,5-trimethoxy-benzoyl)-deserpidate, benzyl 10-chloro-18-O-(3,4,5-trimethoxy-benzoyl)-deserpidate or benzyl 17-desmethoxy-17-ethoxy-18-O-(3,4,5-trimethoxy-benzoyl)-reserpate and the like, may be formed.

In place of the carboxylic acid halides, the corresponding anhydrides are suitable in the esterification procedure; particularly useful are lower aliphatic carboxylic acid anhydrides, e.g. acetic acid anhydride or propionic acid anhydride, to form, for example, benzyl 18-O-acetyl-reserpate, benzyl 18-O-propionyl-reserpate or benzyl 18-O-acetyl deserpidate and the like.

Upon hydrogenolysis according to the procedure of the invention, these compounds yield the desired 18-O-acyl-deserpidic acids, such as, for example, 18-O-acetyl-reserpic acid, 18-O-propionyl-reserpic acid, 18-O-butyryl-reserpic acid, 18-O-hexahydro-benzoyl-reserpic acid, 18-O-(3,4,5-trimethyl-benzoyl)-reserpic acid, 18-O-piperonyl-reserpic acid, 18-O-(4-methoxycarbonyl-syringoyl)-reserpic acid, 18-O-(4-nitro-benzoyl)-reserpic acid, 18-O-(3,4-dichloro-benzoyl)-reserpic acid, 18-O-phenylacetyl-reserpic acid, 18-O-(3,4,5-trimethoxy-cinnamoyl) - reserpic acid, 18-O-nicotinoyl-reserpic acid, 18-O-pivalyl-deserpidic acid, 18-O-(4-methoxy-benzoyl)-deserpidic acid, 18-O-(3,4,5-trimethoxy-benzoyl) - deserpidic acid, 18-O-(4-ethoxycarbonyl-syringoyl)-deserpidic acid, 18-O-(3-dimethylamino-benzoyl)-deserpidic acid, 18-O-(3,4,5-trimethoxy-phenyl-acetyl)-deserpidic acid, 18-O-(3,4,5-trimethoxy-cinnamoyl)-deserpidic acid, 6-methyl - 18-O - (3,4,5-trimethoxy-benzoyl)-reserpic acid, 10-methoxy-18-O-(3,4,5-trimethoxy-benzoyl)-deserpidic acid, 11-ethoxy-18-O-(3-dimethyl-amino-benzoyl)-deserpidic acid, 12-methoxy-18-O-(3,4,5-trimethoxy-benzoyl)-deserpidic acid, 10-chloro-(3,4,5-trimethoxy-benzoyl)-deserpidic acid or 17-desmethoxy-17-ethoxy-18-O-(3,4,5-trimethoxy-benzoyl)-reserpic acid and the like.

As will be shown hereinbelow, such 18-O-acyl-reserpic acide and 18-O-acyl-deserpidic acids may be converted into lower alkyl 18-O-acylated reserpates and lower alkyl 18-O-acylated deserpidates, in which lower alkyl represents methyl, ethyl, n-propyl, n-butyl, isobutyl and the like, by treatment with lower diazoalkanes, e.g. diazomethane, diazoethane, n-diazopropane, n-diazobutane, diazo-isobutane and the like. Other diazo-compounds, which are suitable to convert 18-O-acyl-reserpic acids and 18-O-acyl-deserpidic acids into the corresponding reserpates and deserpidates, are, for example, lower alkoxy-lower diazo-alkanes, e.g. 2 - methoxy-diazoethane, 2 - ethoxy-diazo-ethane, 3-methoxy-diazopropane and the like, or tertiary amino-lower diazoalkanes, such as N,N-di-lower alkyl-amino-lower diazo-alkane e.g. N,N-2-dimethylamino-diazo-ethane, N,N-2-diethylamino-diazo-ethane and the like; these diazo-compounds furnish lower alkoxy-lower alkyl and tertiary amino-lower alkyl 18-O-acyl-reserpates and 18-O-acyl-deserpidates, in which lower alkoxy-lower alkyl, tertiary amino-lower alkyl and acyl have the previously-given meaning.

Example 2

A solution of 0.045 g. of 18-O-(3,4,5-trimethoxy-benzoyl)-reserpic acid in a mixture of methylene chloride and methanol is treated with an excess of a cold solution of diazomethane in ether; the reaction mixture is allowed to stand at room temperature overnight and is then evaporated to dryness. The residue is crystallized from a mixture of methanol and methylene chloride to yield 0.04 g. of reserpine, M.P. 266–272°.

Instead of diazomethane, diazoethane, 2-methoxy-diazomethane or 2-dimethylamino-diazoethane may be used and the corresponding 18-O-3,4,5 - trimethoxy-benzoyl esters of ethyl reserpate, 2-methoxyethyl reserpate or 2-dimethylaminoethyl reserpate may be obtained.

Example 3

By hydrogenating benzyl 18-O-(O-ethoxycarbonyl-syringoyl)-reserpate in the presence of palladium black according to the procedure of Example 1, the desired 18-O-(O-ethoxycarbonyl-syringoyl)-reserpic acid can be obtained.

The starting material may be prepared by reacting benzyl reserpate with O-ethoxycarbonyl-syringoyl chloride according to the procedure described in Example 1.

Example 4

The hydrogenolysis of benzyl 18-O-(3-dimethylamino-benzoyl)-reserpate in the presence of palladium black according to the procedure of Example 1 furnishes the desired 18-O-(3-dimethylamino-benzoyl)-reserpic acid.

The starting material is prepared by reacting benzyl reserpate with 3-dimethylamino-benzoyl chloride according to the procedure of Example 1.

Example 5

Hydrogenolysis of benzyl 18-O-(3,4,5-trimethoxy-benzoyl)-deserpidate by treatment of a methanol solution of the latter with hydrogen in the presence of palladium on charcoal according to the procedure of Example 1 yields the desired 18-O-(3,4,5-trimethoxy-benzoyl)-deserpidic acid.

Upon adding 18-O-(3,4,5-trimethoxy-benzoyl)-deserpidic acid in a mixing of methylene chloride and methanol to an ether solution of diazomethane, deserpidine is obtained, M.P. 228–232°.

The starting material used in the above reaction may be prepared by reacting deserpidic acid lactone with a solution of sodium in an excess of benzylalcohol and esterifying in the resulting benzyl deserpidate the free hydroxyl group in 18-position by treatment with 3,4,5-trimethoxybenzoyl chloride in pyridine to the desired benzyl 18-O-(3,4,5-trimethoxybenzoyl)-deserpidate.

In the final products, substituents may be converted into other substituents; for example, lower alkoxy-carbonyloxy groups may be hydrolized into free hydroxyl groups by treatment with aqueous ammonia, or a nitro group may be reduced into an amino group by treatment with hydrogen in the presence of a catalyst, e.g. palladium on charcoal, or into a dimethylamino group, if the hydrogenation is carried out in the presence of formaldehyde.

Example 6

A mixture of 1 g. of thoroughly dried benzyl 3-oxo-2,3-seco-18-O-(3,4,5-trimethoxy-benzoyl)-reserpate in 25 ml. of phosphorous oxychloride is refluxed for about two hours in an atmosphere of nitrogen. The phosphorous oxychloride is evaporated under reduced pressure, and the residue, consisting mainly of salts of benzyl 3,4-didehydro-18-O-(3,4,5-trimethoxy-benzoyl) - reserpate, particularly the chloride, is subjected to reduction without further purification.

A suspension of 0.5 g. of the above residue in ethanol is shaken in the atmosphere of hydrogen and in the presence of palladium on charcoal as a catalyst. After the uptake of about one mol of hydrogen, the hydrogenation is interrupted, the catalyst is filtered off, the solvent is evaporated and the residue, consisting of a salt of 3,4-didehydro-18-O-(3,4,5-trimethoxy-benzoyl)-reserpic acid, particularly the chloride, is taken up in aqueous perchloric acid containing tetrahydrofuran and acetone as organic solvents. Zinc is added, the reaction mixture is refluxed in an atmosphere of nitrogen and then filtered. The solvent is partly evaporated, aqueous ammonia is added to neutralize the acid and the reaction mixture is taken to dryness and chromatographed on alumina. The desired 18-O-(3,4,5-trimethoxy-benzoyl)-reserpic acid is isolated from the eluate and crystallized from a mixture of methanol and methylene chloride, M.P. 211–213° (crystallizing with one mol of methanol).

The starting material may be prepared as follows: To 10 ml. of benzylalcohol is added about 0.01 g. of sodium and then 1.5 g. of 3-oxo-2,3-seco-reserpic acid lactone and the mixture is heated to about 100° for thirty minutes; it is worked up as shown in Example 1 to yield the desired benzyl 3-oxo-2,3-seco-reserpate. The latter, upon treatment with 3,4,5-trimethoxy-benzoyl in dry pyridine and purification by chromatography on aluminum oxide yields the benzyl 3-oxo-2,3-seco-18-O-(3,4,5-trimethoxy-benzoyl)-reserpate used as the starting material.

Example 7

A mixture of 1 g. of $\Delta^{3(14)}$-18-O-(3,4,5-trimethoxybenzoyl)-reserpic acid and 30 ml. of aqueous acetic acid is treated with zinc; the reaction mixture is warmed and is then worked up as shown in Example 1 to yield the desired 18-O-(3,4,5-trimethoxy-benzoyl)-reserpic acid, M.P. 211–213°.

The starting material may be obtained from the salts of benzyl 3,4-didehydro-18-O-(3,4,5-trimethoxy-benzoyl)-reserpate described in Example 1, by treating such salts with concentrated aqueous ammonia and extracting the benzyl $\Delta^{3(14)}$-18-O-(3,4,5-trimethoxy-benzoyl)-reserpate. An ethanol solution of the latter is treated with one mol of hydrogen in the presence of palladium on charcoal to yield the $\Delta^{3(14)}$-18-O-(3,4,5-trimethoxy-benzoyl)-reserpic acid used in the above procedure.

*Example 8*

A solution of 0.5 g. of 18-O-(3,4,5-trimethoxy-benzoyl)-3-iso-reserpic acid in 20 ml. of glacial acetic acid is refluxed for 24 hours in an atmosphere of nitrogen. The solvent is removed under reduced pressure, water is added and the aqueous solution is extracted with chloroform. The organic phase is washed with water, the solvent is evaporated and the desired 18-O-(3,4,5-trimethoxy-benzoyl)-reserpic acid is obtained after chromatography on aluminum oxide.

The starting material may be obtained, for example, by treating an ethanol suspension of the benzyl $\Delta^{3(14)}$-18-O-(3,4,5-trimethoxy-benzoyl)-reserpate with hydrogen in the presence of palladium on charcoal until no hydrogen is absorbed any longer; the 18-O-(3,4,5-trimethoxy-benzoyl)-reserpic acid is obtained by evaporating the solvent.

What is claimed is:

1. A member of the group consisting of compounds of the formula:

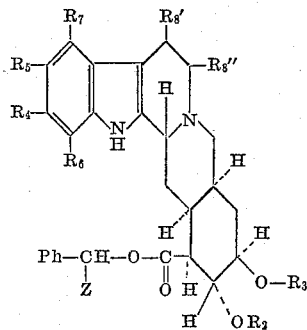

in which $R_2$ represents lower alkyl, $R_3$ represents an acyl radical of an acid selected from the group consisting of benzoic acid substituted by lower alkoxy, lower alkylenedioxy, lower alkoxy-carbonyloxy and di-lower alkylamino, cinnamic acid substituted by lower alkoxy and lower alkoxy-carbonyloxy, each of the radicals $R_4$, $R_5$, $R_6$ and $R_7$ stands for a member of the group consisting of hydrogen, lower alkyl, lower alkoxy, lower alkyl mercapto, amino, nitro, and halogen, each of the radicals $R_8'$ and $R_8''$ represents a member of the group consisting of hydrogen and lower alkyl, Ph represents a member of the group consisting of phenyl and phenyl substituted by lower alkyl, lower alkoxy and halogen, and Z stands for a member of the group consisting of hydrogen and lower alkyl, acid addition salts and alkali metal salts thereof.

2. Benzyl 18-O-(3,4,5-trimethoxy-benzoyl)-reserpate.
3. Benzyl 18-O-(O-ethoxycarbonyl-syringoyl)-reserpate.
4. Benzyl 18-O-(3-dimethylamino-benzoyl)-reserpate.
5. Benzyl 18-O-(3,4,5-trimethoxy-benzoyl)-deserpidate.
6. A member of the group consisting of compounds of the formula:

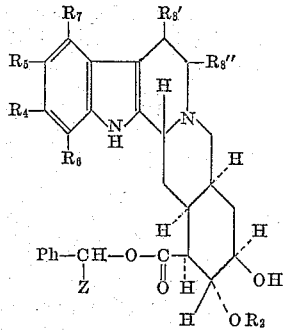

in which $R_2$ represents lower alkyl, each of the radicals $R_4$, $R_5$ and $R_6$ stands for a member of the group consisting of hydrogen, lower alkyl, lower alkoxy, lower alkyl mercapto, amino, nitro and halogen, each of the radicals $R_8'$ and $R_8''$ represents a member of the group consisting of hydrogen and lower alkyl, Ph represents a member of the group consisting of phenyl and phenyl substituted by lower alkyl, lower alkoxy and halogen, and Z stands for a member of the group consisting of hydrogen and lower alkyl, and acid addition salts thereof.

7. Benzyl reserpate.
8. Benzyl deserpidate.

References Cited in the file of this patent
UNITED STATES PATENTS

| | | |
|---|---|---|
| 2,789,112 | Taylor | Apr. 16, 1957 |
| 2,789,113 | Taylor | Apr. 16, 1957 |
| 2,813,871 | Lucas | Nov. 19, 1957 |
| 2,824,874 | Schlittler | Feb. 25, 1958 |
| 2,842,550 | Ulshafer | July 8, 1958 |
| 2,857,386 | Huebner | Oct. 21, 1958 |
| 2,867,622 | Lucas | Jan. 6, 1959 |
| 2,877,225 | Taylor | Mar. 10, 1959 |
| 2,883,384 | Woodward | Apr. 21, 1959 |

FOREIGN PATENTS

| | | |
|---|---|---|
| 1,164,747 | France | May 19, 1958 |
| 1,188,181 | France | Mar. 9, 1959 |
| 1,189,010 | France | Mar. 16, 1959 |
| 212,306 | Australia | Jan. 21, 1958 |

OTHER REFERENCES

Linsker et al.: J. Am. Chem. Soc., vol. 68, pages 192–3 (1946).

Culvenor: Reviews of Pure and Applied Chem., vol. 3, No. 2 (1953), pages 85 and 86.

Woodward: J. Am. Chem. Soc., vol. 78, pages 2023–2025 (1956).

Lucas et al.: J. Am. Chem. Soc., vol. 81, pages 1928–32 (1958).

UNITED STATES PATENT OFFICE
CERTIFICATE OF CORRECTION

Patent No. 3,031,453                      April 24, 1962

Robert Armistead Lucas

It is hereby certified that error appears in the above numbered patent requiring correction and that the said Letters Patent should read as corrected below.

Column 7, line 59, for "An represents" read -- $An^{\ominus}$ represents --; column 10, lines 33 to 46, and column 11, lines 27 to 41, the upper right-hand portion of the formulas, each occurrence, should appear as shown below instead of as in the patent:

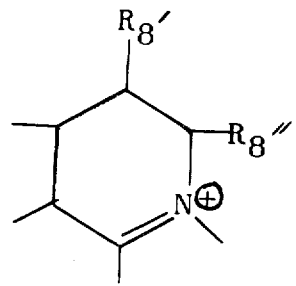

column 12, line 24, for "on of" read -- one of --; column 13, lines 28 and 29, for "18-O-$R_3$-iso-reserpic" read -- 18-O-$R_3$-3-iso-reserpic --; column 19, lines 56 and 57, and column 20, line 27 and 28, for "lower alkyl mercapto", each occurrence, read -- lower alkyl-mercapto --.

Signed and sealed this 20th day of August 1963.

(SEAL)
Attest:

ERNEST W. SWIDER
Attesting Officer

DAVID L. LADD
Commissioner of Patents